United States Patent [19]
Duncan

[11] Patent Number: 5,949,852
[45] Date of Patent: Sep. 7, 1999

[54] METHOD FOR RECORDING MESSAGES FOR ABSENT PARTIES

[75] Inventor: Hibbert Alexander Duncan, Lawrenceville, N.J.

[73] Assignee: AT&T Corp, New York, N.Y.

[21] Appl. No.: 08/772,197

[22] Filed: Dec. 20, 1996

[51] Int. Cl.[6] .......................... H04M 1/64; H04M 11/00; H04M 3/42; H04M 3/00
[52] U.S. Cl. .................. 379/67.1; 379/88.01; 379/88.12; 379/88.17; 379/88.24; 379/93.01; 379/100.02; 379/201; 379/207; 379/214; 379/252; 379/260
[58] Field of Search ................................... 379/67, 88, 89, 379/67.1, 88.01, 93.01, 100.02, 201, 207, 214, 88.12, 88.17, 88.24, 252, 260

[56] References Cited

U.S. PATENT DOCUMENTS

| | | | |
|---|---|---|---|
| 4,757,525 | 7/1988 | Matthews et al. | 379/89 |
| 4,776,005 | 10/1988 | Petriccione et al. | 379/142 |
| 4,782,510 | 11/1988 | Szlam | 379/88 |
| 5,117,451 | 5/1992 | Ladd et al. | 379/67 |
| 5,133,004 | 7/1992 | Heileman, Jr. et al. | 379/67 |
| 5,185,781 | 2/1993 | Dowden et al. | 379/67 |
| 5,195,128 | 3/1993 | Knitl | 379/67 |
| 5,283,818 | 2/1994 | Klausner et al. | 379/67 |
| 5,400,393 | 3/1995 | Knuth et al. | 379/88 |
| 5,483,577 | 1/1996 | Gulick | 379/67 |
| 5,509,061 | 4/1996 | Amereller et al. | 379/207 |
| 5,550,754 | 8/1996 | McNelley et al. | 364/514 A |
| 5,623,538 | 4/1997 | Petty | 379/67 |

*Primary Examiner*—Fan S. Tsang
*Assistant Examiner*—Allan Hoosain

[57] ABSTRACT

A method is described for electronically recording messages after the called telephone goes off-hook. The method may be physically implemented by an apparatus in the home or office, or by a system installed in a service provider central office. When a call is received, the telephone receiver is taken off the hook and the caller is asked if they would like to leave an electronic message. If the caller decides to leave an electronic message, the record function is initiated by the answering party via a record button physically provided on the system, by a keystroke sequence on the telephone station set keypad, or by voice command. The message speech is sampled, each sample is processed to extract speech information, each extracted signal is encoded, and then each encoded signal is stored in memory. For message retrieval, the memory location of the beginning of the first stored message is accessed, the data in each location is decoded to recover the speech content, and then the decoded data is reconverted to an analog signal that is played back through the telephone receiver. Separate mailboxes may be provided for each member of the household, allowing each possible recipient to only play back those messages intended for that party. A control unit facilitates and controls the sequence of the various processing steps required by the method, including keeping a record of the addresses of memory locations where stored messages start, erasure of stored messages, and separation of the stored messages into separate mailboxes.

11 Claims, 5 Drawing Sheets

METHOD FOR RECORDING MESSAGES FOR ABSENT PARTIES

FIELD OF THE INVENTION

The present invention relates to telephone answering services and, in particular, to a method for electronically recording messages after the telephone has gone off-hook.

BACKGROUND OF THE INVENTION

Frequently, especially in the home, phone messages left for absent household members with another member of the household are not recorded and are consequently not delivered. Even when a message is physically recorded by the answering party, the caller has no control over what portion of the message is actually recorded, nor can the caller verify the accuracy of the record. Further, paper messages are easily and frequently misplaced or destroyed before delivery to the intended recipient.

There currently exist many mechanisms by which a caller can electronically leave a message for an absent party, such as the answering machine and the voicemail system. These systems function, however, only when the call is unanswered by a person at the physical location of the receiving telephone station set. Once the telephone goes off-hook, such as when a person actually answers the phone, these systems are disabled and cannot then be used to record a message for the intended recipient.

In the business setting, some methods do exist for routing a caller to voicemail once the call has been answered. Such systems, however, generally require a private branch exchange (PBX) or similar type of internal network. Such a system is often not economically practical for a small business, and nothing of the type exists for the ordinary home. What is needed, therefore, is a system that will allow a caller to a private phone line to electronically leave a message, even after the phone has been answered by another party, wherein the message may be retrieved by the intended recipient when desired.

Accordingly, a primary object of the present invention is to provide a way for callers to electronically leave a message for a party other than the party answering the call. In particular, an object of the present invention is to relieve an answering party of the obligation to physically record or otherwise remember a message for another party. A further particular object of this invention is to give the caller the security of knowing that a message left for an absent party will be accurately recorded and delivered.

SUMMARY OF THE INVENTION

A method is described for electronically recording messages after the called telephone goes off-hook. This method may be physically implemented by an apparatus in the home or office, preferably as part of the telephone station set, or may be implemented by a system installed in a service provider central office and controlled by the user through the station set dial keypad.

In one aspect of the invention, when a call is received, if the telephone receiver is not taken off the hook by a person answering the phone, the call is electronically answered and a message recorded in the conventional manner. However, if the phone is taken off the hook, and off-hook signal is received at telephone service provider apparatus, the call is electronically monitored and the caller may be asked if they would like to leave an electronic message. If the caller decides to leave an electronic message, the record function is initiated by the answering party via a record button physically provided on the system, by a keystroke sequence on the telephone station set dial keypad, or by voice command.

As the caller leaves the message, the speech is sampled. Each sample is processed to extract speech information, the extracted signal is encoded, and the encoded signal is stored in memory. This process continues until the caller terminates the message. When the message is complete, the address of the memory location where the message starts is stored and the message counter is incremented.

In another aspect of the invention, for message retrieval, the user lifts the telephone receiver off the hook and activates the message play function via a button physically located on the system, by keystrokes on the telephone dial keypad, or by voice command. The memory location of the beginning of the first stored message is accessed and the data is decoded to recover the speech content and then reconverted to an analog signal that is played back through the telephone receiver to the user. This process is repeated until no more of the message remains The user may choose whether or not to erase the message. If additional unplayed messages remain, the memory location of the beginning of the next stored message is then accessed and the process is repeated.

In a further aspect of the invention, separate mailboxes may be provided for each member of the household. This allows each possible recipient to only play back those messages intended for her or him. The answering party directs the caller's message to the mailbox of the intended party at the time recording is initiated. The intended party then plays back only those messages by entering the correct mailbox code or pushing the appropriate button immediately after initiating the message playback function.

In one embodiment of the system, a control unit facilitates and controls the sequence of the various processing steps required by the method, including keeping a record of the addresses of memory locations where stored messages start. For voice command control, in the preferred embodiment the control unit contains additional circuitry or system components for voice recognition, preferably utilizing a Hidden Markov Model (HMM)-type voice recognition scheme, although the voice command circuitry may also be located in a separate module. The control unit also handles the erasure of stored messages and separation of the stored messages into separate mailboxes.

DETAILED DESCRIPTION

In the method of the invention, when a call is received, the receiver of the called telephone is taken off the hook, an indication signal of answer, such as off-hook signal, is received at telephone service provider apparatus- after "established", insert—among a caller, the called telephone, and, station apparatus or, in a preferred embodiment, telephone service provider apparatus for monitoring call progress and recording and playing messages whose operation will be further described herein in connection with FIGS. 3–6 and a voice connection established. The caller is asked by the person answering the phone if they would like to leave an electronic message for the absent party. If the caller decides to leave an electronic message, the record function is initiated by the answering party. The caller leaves a message which is stored for later retrieval by the intended party.

The intended party retrieves the message by lifting the telephone receiver off the hook and then activating the message play function. The system will announce the number of messages available and then access the beginning of the first stored message, which is played back through the telephone receiver to the user. The user chooses whether or not to erase the message, and then the beginning of the next stored message is accessed for playback to the user.

Figure 1:
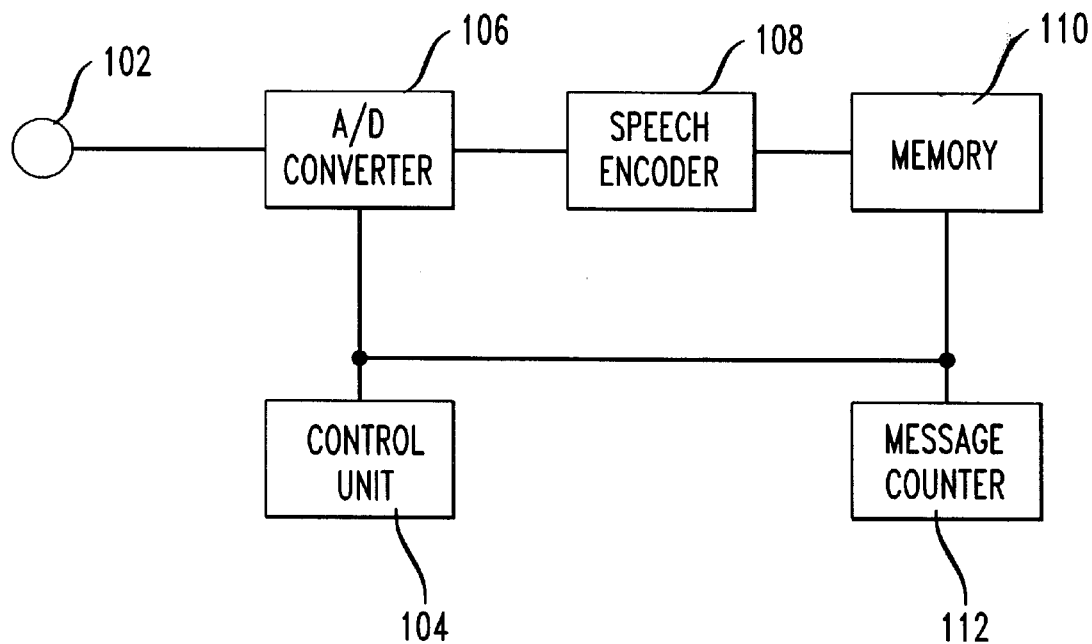
FIG. 1 is a block diagram of an embodiment of a system for recording a message using the method of the present invention.

As seen in FIG. 1, in one embodiment of the system, the caller's message is received by the telephone receiver microphone 102. The microphone 102 and speaker 204 (FIG. 2) comprise portions of a called party's telephone station apparatus further including a dial keypad (not shown) for receiving keystrokes. In a preferred embodiment, all other elements of FIGS. 1 and 2, including elements 106–112 and 202–208 and 212 are implemented in telephone service provider apparatus but may be implemented as telephone station apparatus. The control unit 104 of the preferred embodiment facilitates and controls the sequence of the various processing steps required by the method. The control unit 104 also keeps a record of the addresses of memory locations where stored messages start. In the preferred embodiment, the control unit is microprocessor-based, for example an 8-bit controller such as the Motorola MC68HC11. When software-driven, the control unit and memory storage functions may be implemented on a single chip containing a CPU, ROM for holding program instructions, and RAM for message storage.

In a preferred embodiment, the data from the microphone 102 is sampled at 8 kHz by an 8-bit A/D converter 106. In one embodiment, this is efficiently performed using a CODEC (a circuit functioning as both a coder and decoder), such as the Texas Instruments TLV32036. A higher sampling rate may be used if greater accuracy is desired, but memory requirements will commensurately increase. In certain circumstances, it may be desirable to employ a sample-and-hold circuit and/or an input buffer, for example a FIFO, and these are within the scope of what is contemplated by the inventor.

The sampled signal is processed to extract the speech information and the extracted information is encoded by the encoder 108 in a manner that reduces memory storage requirements. In a preferred embodiment, this function is also performed by the CODEC. In particular, data compression may be accomplished via Linear Predictive Coding (LPC) or any other known compression technique in order to decrease the storage space occupied by each message in memory. Although filtering is not necessary, it could certainly be used in the invention were it found to provide advantages.

Next, the encoded message is stored in the system memory 110 and the address of the memory location where the message starts is relayed to the control unit 104. In the preferred embodiment, the memory for message storage is implemented in RAM, with tags being used to indicate the memory locations where messages begin. In this embodiment, the memory addresses of these message-starting locations are stored in a separate table for look-up by the control unit 104.

The message counter 112 is then incremented by the control unit 104 in order to keep count of the total number of messages stored in the system. The counter 112 may be implemented in hardware, for example by an up/down counter, or in software utilizing the table containing the message-start locations and a special counter memory location.

For voice command control, in the preferred embodiment, the control unit contains additional software and circuitry or system components for voice recognition. In a preferred embodiment, a speaker-independent Hidden Markov Model (HMM)-type automatic speech recognition (ASR) system is used, involving the extraction of a particular predetermined set of features from the incoming speech, performing statistical analysis on the extracted features, and obtaining various resultant parameters for comparison to a standard. If the resultant parameters are within a predetermined tolerance, the incoming command is translated to a prestored electronic signal that is then communicated to the rest of the system. HMM can be implemented through software embedded in the control unit or in a separate unit.

Other alternatives to HMM that are known in the art may also be used, such as, for example, a template matching method. Whatever the recognition method used, in the preferred embodiment a method is provided for the detection and correction of voice command recognition errors, such as by having the system indicate to the user the operation currently being undertaken, and allowing the user to halt the execution of the misinterpreted instruction by, for example, pushing a button or entering a keystroke on the keypad.

A speaker-dependent voice recognition system may also be used, requiring some additional circuitry and control commands in order for the system to learn the voices of the authorized users. This type of system must be trained, but might be particularly valuable in the office environment, where a higher degree of privacy and security is often desirable, particularly if the office phones are accessible to visitors and customers of the business.

Alternatively, the voice command circuitry and software could be located in a separate module. Supplying the voice command module as a plug-in option may be advantageous in certain situations, particularly for manufacturing considerations. In a preferred embodiment, this module has an independent CPU, ROM and RAM, much like the control unit.

Figure 2:
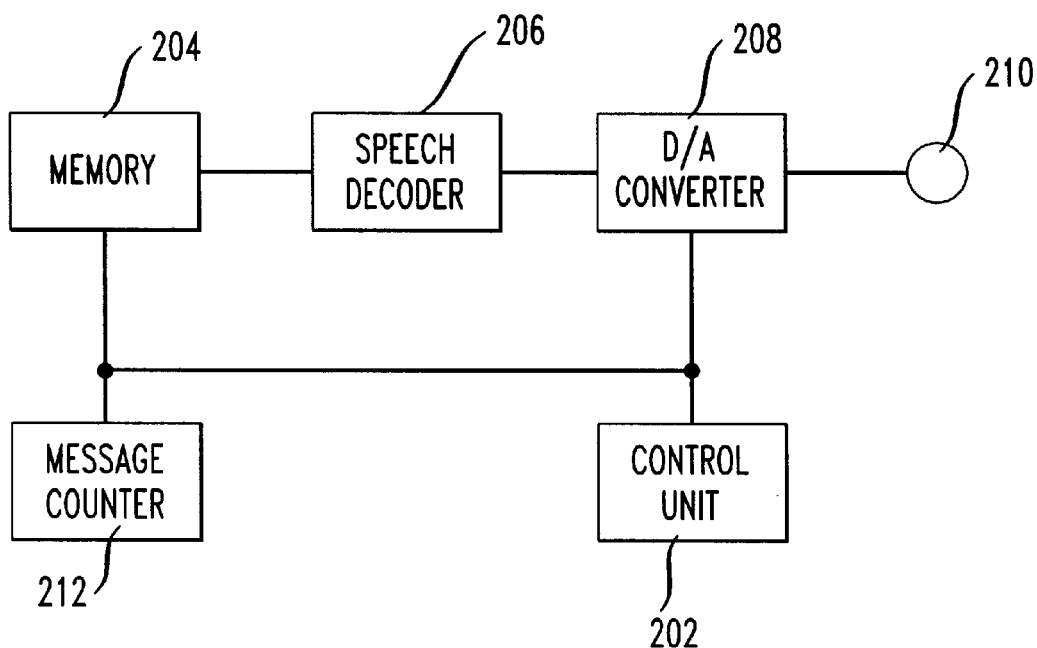
FIG. 2 is a block diagram of an embodiment of a system for retrieving the message FIG. 1.

Similarly, in the embodiment of a system for performing the method shown in FIG. 2, the message play function is activated when the control unit 202 receives the play electronic signal generated either by a button physically located on the system, by a particular series of strokes on the telephone dial keypad, or by translation from a voice command. The particular series of keystrokes of a telephone dial (not shown), typically of the dual tone frequency type, are converted to signals for reception and decoding by tone receivers (not shown in FIG. 1 or 2), for example, of telephone service provider apparatus and whose decoded values are reported to control unit 104, 202.

In the preferred embodiment, the system first announces, via the telephone receiver 210, the number of messages available to be played. The number of messages available may also be displayed on the machine, either constantly or when requested, utilizing standard circuitry and hardware such as an LCD or LED display. In a preferred embodiment, the system has a stored group of voice prompts that are played as announcements at the appropriate time in order to guide the user in the use of the system, particularly in the message playback mode.

The system then initiates playback of the stored messages. The memory address of the beginning of the first message is located in the memory 204 by the control unit 202. The message is decoded by the decoder 206 to recover the speech content. In a preferred embodiment of the invention, the control unit 202 retrieves the message-start address, locates the address in memory, the begins the decoding process utilizing, for example the bidirectional CODEC previously described. The control unit reads from memory into the CODEC, triggering and synchronizing the sending of output from the CODEC, continuing until the end of the chain of memory locations for that message is reached.

The decoded message is converted to an analog signal by the D/A converter 208. Again, in one embodiment, this step is performed using a CODEC. Use of output buffering may provide advantages in certain applications, and, of course, the decoding method must be matched to the particular encoding scheme utilized during message storage (e.g. LPC).

Finally, the recovered analog version of the message is presented to the user via the telephone receiver speaker 210. At the preferred 8 kHz or higher sampling rate, speech distortion due to sampling and coding errors is generally not significant. If additional messages remain in memory, they are individually retrieved, decoded, and reconverted to analog one at a time in a similar fashion. The user may be prompted by voice announcements stored in the system at each step, for example, to ascertain if the user is ready to hear the next message.

The control unit 202 also handles the erasure of stored messages when desired, as by the intended recipient after the message has been received. In one embodiment, this is accomplished by removing the message-start address from the message-start address table. If desired, a second table may be utilized to separately track new, unlistened-to messages, and old messages that have been listened-to but not deleted. This could have the advantage of avoiding undesired replay of old, stored messages every time message playback is initiated.

Again, for voice command control, in the preferred embodiment the control unit contains additional circuitry or system components for voice recognition. Alternatively, the voice command circuitry may be located in a separate module. In the preferred embodiment, the system has a switching arrangement in command mode between the voice recognition function and the record or play mode.

In one embodiment, the system provides separate mailboxes for each member of the household, allowing each possible recipient to only play back those messages intended for her or him. Separation of the messages into separate mailboxes, or queues, is controlled by the control unit 202, which keeps a separate table of message starting addresses for each private mailbox. Separate commands then cause the control unit to read only those messages starting at the message-start locations of a specific table.

Figure 3:
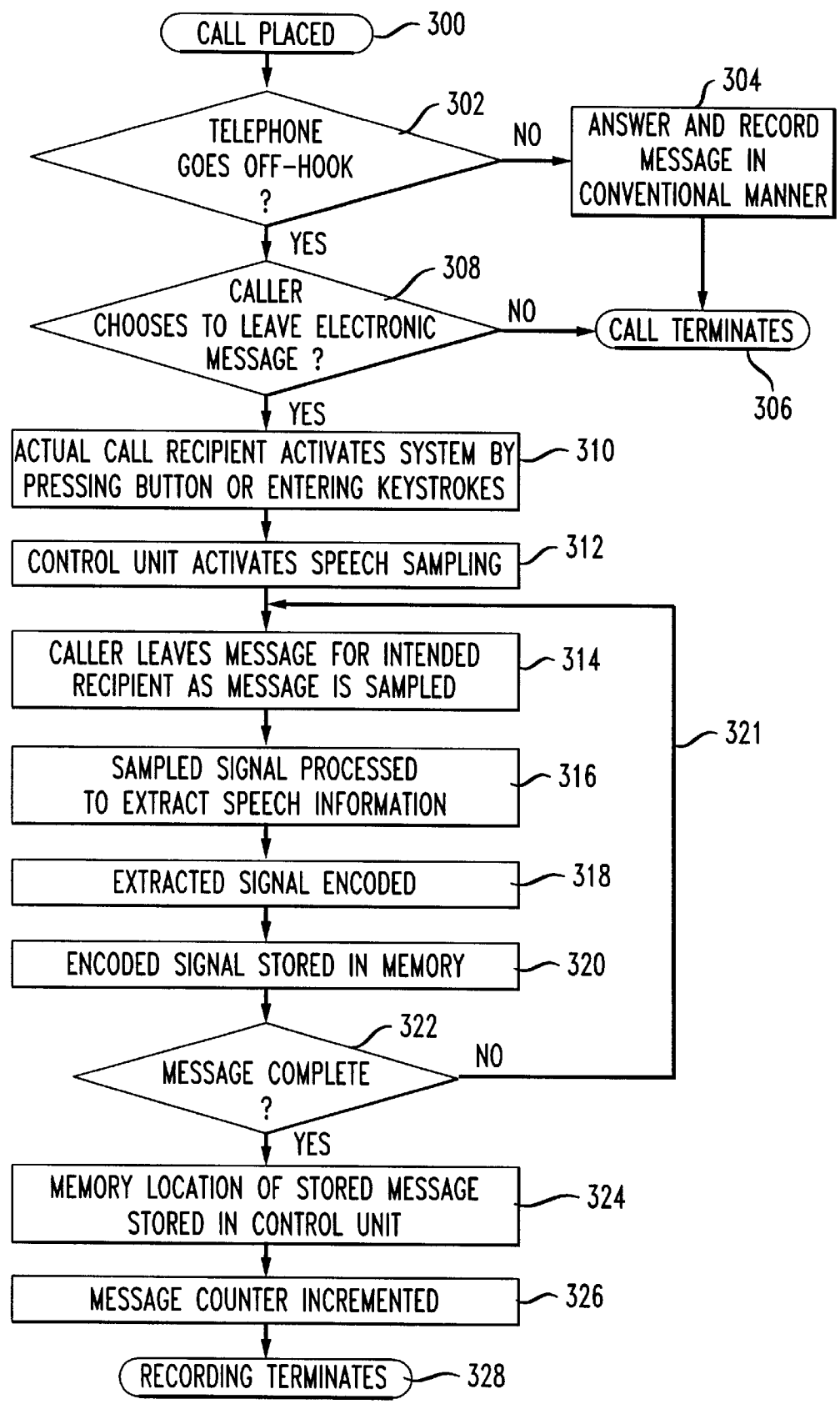
FIG. 3 illustrates the recording of a message utilizing a button or keypad control according to the method of the present invention.

As illustrated in FIG. 3, when a call is placed 300, if the telephone receiver is not taken off the hook 302 by a person answering the phone, the call is electronically answered and a message recorded in the conventional manner 304, after which the call terminates 306. If, however, the call is answered by a person taking the phone off the hook 302, the caller is asked by the person answering the phone if they would like to leave an electronic message 308 for the absent party.

If the caller decides not to leave an electronic message, a paper message may still optionally be taken by the answering party, after which the call is terminated 304. If the caller decides to leave an electronic message, the record function is initiated 310 by the answering party by pressing a record button physically provided on the system. Alternatively, the record function may be initiated 310 by the answering party by entering the appropriate keystroke sequence on the telephone station set keypad. After the record function is activated, the answering party is free to hang up the telephone.

Although digital recording and storage in computer memory is utilized in the preferred embodiment of the invention, any of the many other recording or storage methods known in the art are also contemplated, such as audiotape or CD-ROM. In addition, the invention may be utilized in a picturephone-type system, for which any of the video recording and storage methods known in the art are contemplated, such as videotape, CD-ROM, and digital recording and storage.

Activation of the record function 310, causes speech sampling of the caller's voice to begin 312. In the preferred embodiment, this is preceded by an announcement pursuant to FCC regulations indicating that the caller's message is being electronically recorded and that if the caller does not wish to be electronically recorded he or she should hang up now. The caller leaves a message 314 as his or her speech is sampled. Each sample is processed to extract speech information 116, and the extracted signal is then encoded 318 in a manner that reduces memory storage requirements. The encoded signal is then stored in memory 320. This process repeats 321 until the caller terminates the message and the call.

When the message is complete 322, the address of the memory location where the message starts is stored 324 and the message counter is then incremented 126 in order to keep count of the total number of messages stored in the system. The message recording process then terminates 328.

Figure 4:
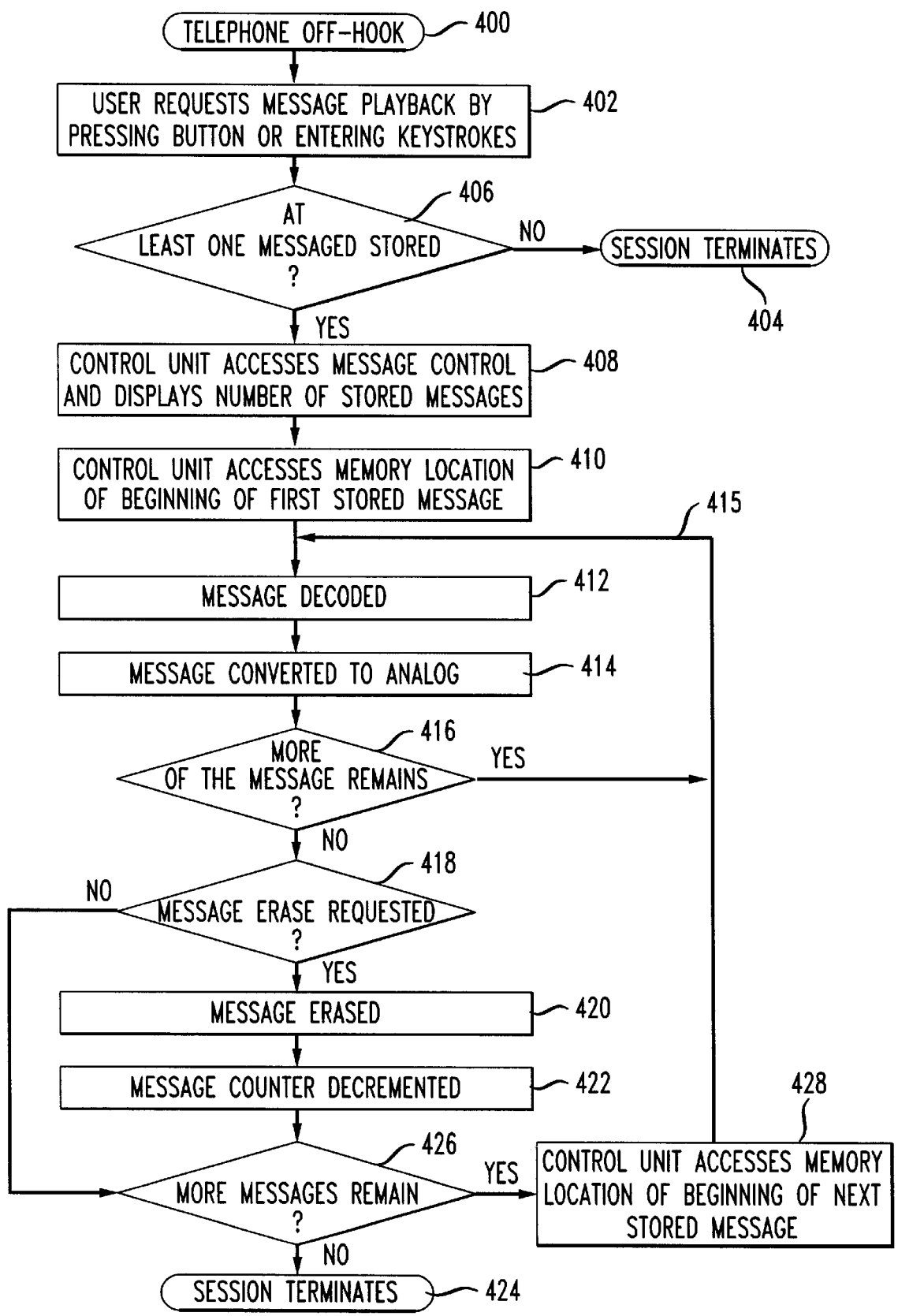
FIG. 4 illustrates the retrieval of the message of FIG. 3 by the intended party.

FIG. 4 illustrates the message retrieval process. The user lifts the telephone receiver off the hook 400, and then activates the message play function 402 either by a pressing a button physically located on the system or, alternatively, by entering a particular series of keystrokes on the telephone keypad. If there are no messages stored, the system will so indicate and will terminate the session 404.

If there is at least one message stored 406, the system will announce the number of messages available 408. Alternatively, or additionally, the telephone station set or separate apparatus may have a display for showing the number of stored messages either constantly, or upon request by the user via a button or a series of keypad keystrokes.

Playback of the stored messages is then initiated by accessing 410 the memory location of the beginning of the first stored message. The data in the first memory location is decoded 412 to recover the speech content and reconverted to an analog signal 414 that is played back through the telephone receiver to the user. This process is repeated 415 until no more of the message remains 416. The user chooses whether or not to erase the message 418. If the message is erased 420, the message counter is also decremented 422.

If all the stored messages have been played, the session terminates 424. If additional unplayed messages remain 426, the memory location of the beginning of the next stored message is accessed 428 and the process is repeated 430, starting with decoding 412 the data in the first memory location.

In one embodiment, separate mailboxes are provided for each member of the household. This allows each possible recipient to only play back those messages intended for her or him. The person answering the telephone directs the caller's message to the mailbox of the intended party at the time recording is initiated, either by pushing a preset button or by entering keystrokes on the dial keypad that correspond to the correct mailbox. The intended party then plays back only the messages intended for that party by entering the correct mailbox code via the dial keypad pushing the appropriate button immediately after initiating the message playback function.

Figure 5:
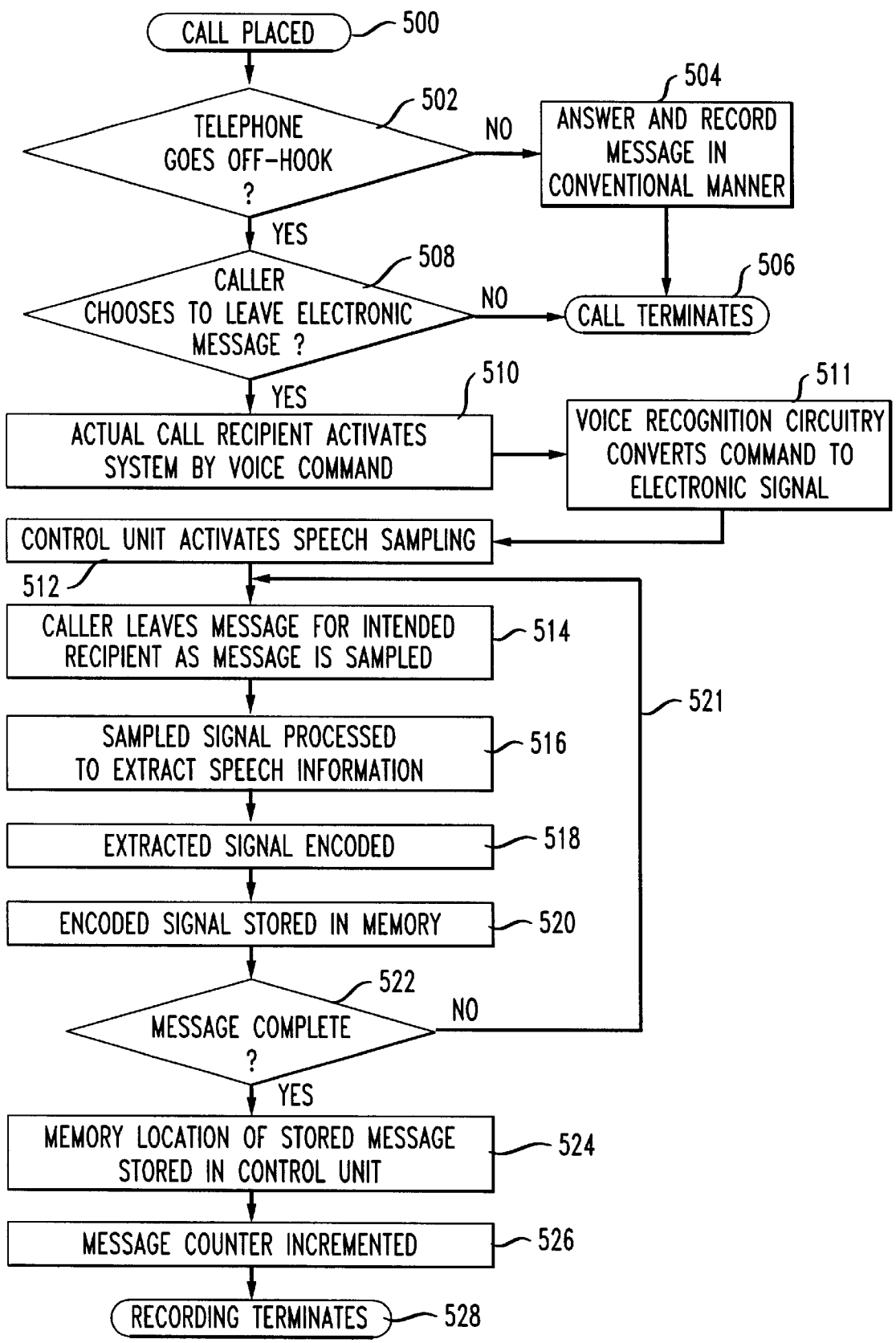
FIG. 5 illustrates the recording of a message utilizing voice control according to the method of the present invention.

In an alternate embodiment, the system is controlled through voice commands. As shown in FIG. 5, when the call is placed 500, if the telephone receiver is not taken off the hook 502, the call is again electronically answered and a message recorded in the conventional manner 504, after which the call terminates 506. If the call is answered by a person taking the phone off-hook 502, the caller is asked if they would like to leave an electronic message 508.

As before, if the caller decides not to leave an electronic message, a paper message may still optionally be taken by the answering party, after which the call is terminated 504. If the caller decides to leave an electronic message, the record function is initiated 510 by the answering party via a voice command. The voice command is converted to an electronic signal 511, upon its recognition by voice recognition circuits described above, causing speech sampling of the caller's voice to begin 512. The answering party may then hang up the telephone.

The caller leaves a message 514 as his or her speech is sampled. Each sample is processed to extract speech information 516, and the extracted signal is then encoded 518 and stored in memory 520. This process continues 521 until the caller terminates the message and the call. When the message is complete 522, the address of the memory location where the message starts is stored 524, the message counter is incremented 526, and the message recording process terminates 528.

Figure 6:
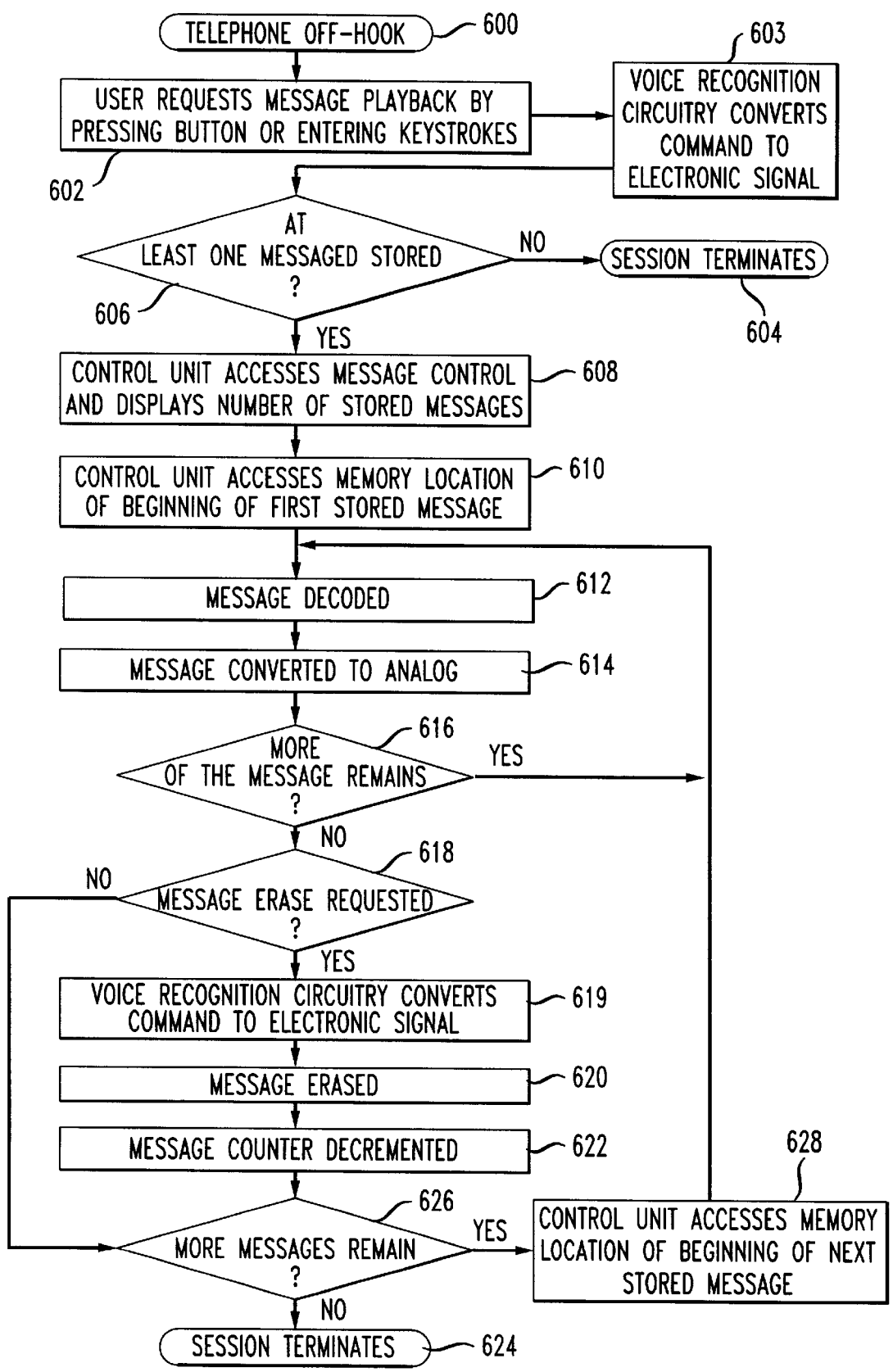
FIG. 6 illustrates the retrieval of the message of FIG. 5 by the intended party.

Similarly, as illustrated in FIG. 6 for message retrieval, the user takes the receiver off-hook 600, and then activates the message play function 602 by giving a voice command. The voice command is converted to an electronic signal 603 which may be a detailed voice command identifying a mailbox code and/or may be recognized by the voice recognition circuits as the voice of the absent party whose messages are stored at particular memory locations. If there are no messages stored, the system will indicate it and will terminate the session 604. If there is at least one message stored 606, the system will announce the number of messages available 608. Again, the telephone station set or separate apparatus may also, or alternatively, have a display for showing the number of stored messages either constantly, or upon request by the user via voice command, a button, or a series of keypad keystrokes.

Playback of the stored messages is initiated by accession 610 of the memory location of the beginning of the first stored message. The data in the first memory location is decoded 612 to recover the speech content and reconverted to an analog signal 614 that is played back through the telephone receiver to the user. This process is repeated 615 until no more of the message remains 616. The user may choose to erase the message 618 by giving the appropriate voice command, which is converted into an electronic signal 619. If the message is erased 620, the message counter is also decremented 622.

If all the stored messages have been played, the session terminates 624. If additional unplayed messages remain 626, the memory location of the beginning of the next stored message is accessed 628 and the process is repeated 630, starting with decoding 612 the data in the first memory location of the current message.

Voice commands may also be used to direct the caller's message to a particular recipient's private mailbox, allowing each recipient to only play back those messages intended for her or him. The person answering the telephone directs the caller's message to the mailbox of the intended party at the time recording is initiated by using a voice command that is recognized by the system and translated into an electronic signal. The intended recipient then may play back just the messages intended for that party by giving the appropriate command for access to the party's particular mailbox.

The system elements 104–112 of FIG. 1 and 202–208 and 212 of FIG. 12 may be physically located in the user's home or office, or may be located in the service provider central office in a preferred embodiment. If in the user's home or office, it is preferably placed in the telephone station set, but may alternatively be a separate device similar to a standard answering machine. An apparatus physically located in the home or office may be controlled either by dedicated buttons, possibly having user-programmable options, or by a set of series of one or more keystrokes on the station set dial keypad. If the apparatus is located in the service provider central office, control is generally through the dial keypad keystroke mechanism of the called party station apparatus.

What has been described is merely illustrative of the application of the principles of the present invention. Other arrangements, methods, modifications and substitutions by one of ordinary skill in the art are also considered to be within the scope of the present invention, which is not to be limited except by the claims which follow.

What is claimed is:

1. A method for use in a telecommunications network comprising calling party telephone apparatus, telephone service provider apparatus and called party telephone apparatus including a dial keypad, said method for recording messages for absent parties from said called party telephone apparatus, said method comprising, in combination, the steps of:

receiving an indication signal of answer of said called party telephone apparatus and, responsive to said indication signal, establishing a voice connection among said calling party telephone apparatus, said telephone service provider apparatus and an answering party other than said called party at said called party telephone apparatus;

electronically monitoring said voice connection at said telephone service provider apparatus for signals representing an absent condition of said called party;

asking a calling party if they would like to leave a message for said absent party;

responsive to a calling party indicating a desire to leave a message for said absent party, initiating said record function via receiving signals at said telephone service provider apparatus, said signals representing an appropriate sequence of keystrokes on said dial keypad of said called party telephone apparatus, said keystrokes corresponding to a mailbox of said absent party;

responsive to receipt of said signals at said telephone service provider apparatus, sampling said calling party's voice at said telephone service provider apparatus as said calling party leaves said message for said absent party in order to obtain a plurality of voice samples;

processing each of said plurality of voice samples to extract speech information at said telephone service provider apparatus;

encoding said extracted speech information at said telephone service provider apparatus;

storing at said telephone service provider apparatus said encoded extracted speech information in one of a plurality of memory locations;

storing at said telephone service provider apparatus the address of the one of said plurality of memory locations where said message starts; and incrementing a message counter at said telephone service provider apparatus in order to keep count of the total number of messages stored for said absent party.

2. A method as recited in claim 1 further comprising the step of said absent party playing messages stored at said telephone service provider apparatus, said message play process comprising the substeps of receiving an indication of answer of said called party telephone apparatus and establishing a voice connection between said called party telephone apparatus and said telephone service provider apparatus;

receiving signals at said telephone service provider apparatus, said signals representing an appropriate sequence of keystrokes by said absent party on said dialing keypad of said called party telephone apparatus;

activating said message play function;

announcing a number of messages for said absent party as incremented on said message counter of said telephone service provider apparatus, and accessing said memory location of the start of said first stored message for said absent party.

3. A method as recited in claim 2 further comprising the step of accessing a memory location of the start of the next stored message if additional unplayed messages remain for said absent party.

4. A method as recited in claim 1 further comprising the step of said absent party playing messages stored at said telephone service provider apparatus, said message play process comprising the substeps of receiving an indication of answer of said called party telephone apparatus and establishing a voice connection between said called party telephone apparatus and said telephone service provider apparatus;

receiving signals at speaker-dependent voice recognition circuits of said telephone service provider apparatus, said signals representing a voice command by said absent party from said called party telephone apparatus;

activating said message play function responsive to receipt of said voice command;

announcing a number of messages for said absent party as incremented on said message counter of said telephone service provider apparatus, and accessing said memory location of the start of said first stored message for said absent party.

5. A method as recited in claim 1 comprising the steps of maintaining said voice connection between said calling party and said telephone service provider apparatus so long as said calling party remains off hook after receipt of said signals representing said appropriate sequence of keystrokes from said called party telephone apparatus at said telephone service provider apparatus followed by receipt at said telephone service provider apparatus of a signal indicating said called party has gone on hook.

6. A method as recited in claim 1 further comprising the step of maintaining a separate table of message starting addresses for each potential absent party of a plurality of absent parties at said telephone service provider apparatus.

7. A method for use in a telecommunications network comprising calling party telephone apparatus, telephone service provider apparatus and called party telephone apparatus including a microphone, said method for recording messages for absent parties from said called party telephone apparatus, said method comprising, in combination, the steps of:

receiving an indication signal of answer of said called party telephone apparatus and, responsive to said indication signal, establishing a voice connection among said calling party telephone apparatus, said telephone service provider apparatus and an answering party other than said called party at said called party telephone apparatus;

electronically monitoring said voice connection at said telephone service provider apparatus for signals representing an absent condition of said called party;

asking a calling party if they would like to leave a message for said absent party;

responsive to a calling party indicating a desire to leave a message for said absent party, initiating said record function via receiving signals at speaker-dependent voice recognition circuits of said telephone service provider apparatus, said signals representing a voice command by said called party from said microphone of said called party telephone apparatus, said voice command corresponding to a mailbox of said absent party;

recognizing said called party's voice command, responsive to recognizing said called party's voice command signals at said telephone service provider apparatus, sampling said calling party's voice at said telephone service provider apparatus as said calling party leaves said message for said absent party in order to obtain a plurality of voice samples;

processing each of said plurality of voice samples to extract speech information at said telephone service provider apparatus;

encoding said extracted speech information at said telephone service provider apparatus;

storing at said telephone service provider apparatus said encoded extracted speech information in one of a plurality of memory locations;

storing at said telephone service provider apparatus the address of the one of said plurality of memory locations where said message starts; and incrementing a message counter at said telephone service provider apparatus in order to keep count of the total number of messages stored for said absent party.

8. A method as recited in claim 7 further comprising the step of said absent party playing messages stored at said telephone service provider apparatus, said message play process comprising the substeps of receiving an indication signal of answer of said called party telephone apparatus and establishing a voice connection between said called party telephone apparatus and said telephone service provider apparatus;

receiving signals at said speaker-dependent voice recognition circuits of said telephone service provider apparatus, said signals representing a voice command by said absent party from said called party telephone apparatus;

activating said message play function responsive to receipt of said voice command;

announcing a number of messages for said absent party as incremented on said message counter of said telephone service provider apparatus, and accessing said memory location of the start of said first stored message for said absent party.

9. A method as recited in claim 7 comprising the steps of maintaining said voice connection between said calling party and said telephone service provider apparatus so long as said calling party remains off hook after recognition of said signals representing said voice command from said called party telephone apparatus at said telephone service provider apparatus followed by receipt at said telephone service provider apparatus of a signal indicating said called party has gone on hook.

10. A method as recited in claim 7 further comprising the step of maintaining a separate table of message starting addresses for each potential absent party of a plurality of absent parties at said telephone service provider apparatus.

11. A method for use in a telecommunications network comprising calling party telephone apparatus, telephone service provider apparatus and called party telephone apparatus including a dial keypad, said method for recording messages for absent parties from said called party telephone apparatus, said method comprising, in combination, the steps of:

receiving an indication signal of answer of said called party telephone apparatus and, responsive to said indication signal, establishing a voice connection among said calling party telephone apparatus, said telephone service provider apparatus and an answering party other than said called party at said called party telephone apparatus;

electronically monitoring said voice connection at said telephone service provider apparatus for signals representing an absent condition of said called party;

asking a calling party if they would like to leave a message for said absent party;

responsive to a calling party indicating a desire to leave a message for said absent party, initiating said record function via receiving a signal at said telephone service provider apparatus, said signal representing a predetermined keystroke on said dial keypad of said called party telephone apparatus, said predetermined keystroke corresponding to a mailbox of said absent party;

responsive to receipt of said keystroke signal at said telephone service provider apparatus, sampling said calling party's voice at said telephone service provider apparatus as said calling party leaves said message for said absent party in order to obtain a plurality of voice samples;

processing each of said plurality of voice samples to extract speech information at said telephone service provider apparatus;

encoding said extracted speech information at said telephone service provider apparatus;

storing at said telephone service provider apparatus said encoded extracted speech information in one of a plurality of memory locations;

storing at said telephone service provider apparatus the address of the one of said plurality of memory locations where said message starts; and incrementing a message counter at said telephone service provider apparatus in order to keep count of the total number of messages stored for said absent party.

* * * * *